United States Patent Office 3,279,866
Patented Oct. 18, 1966

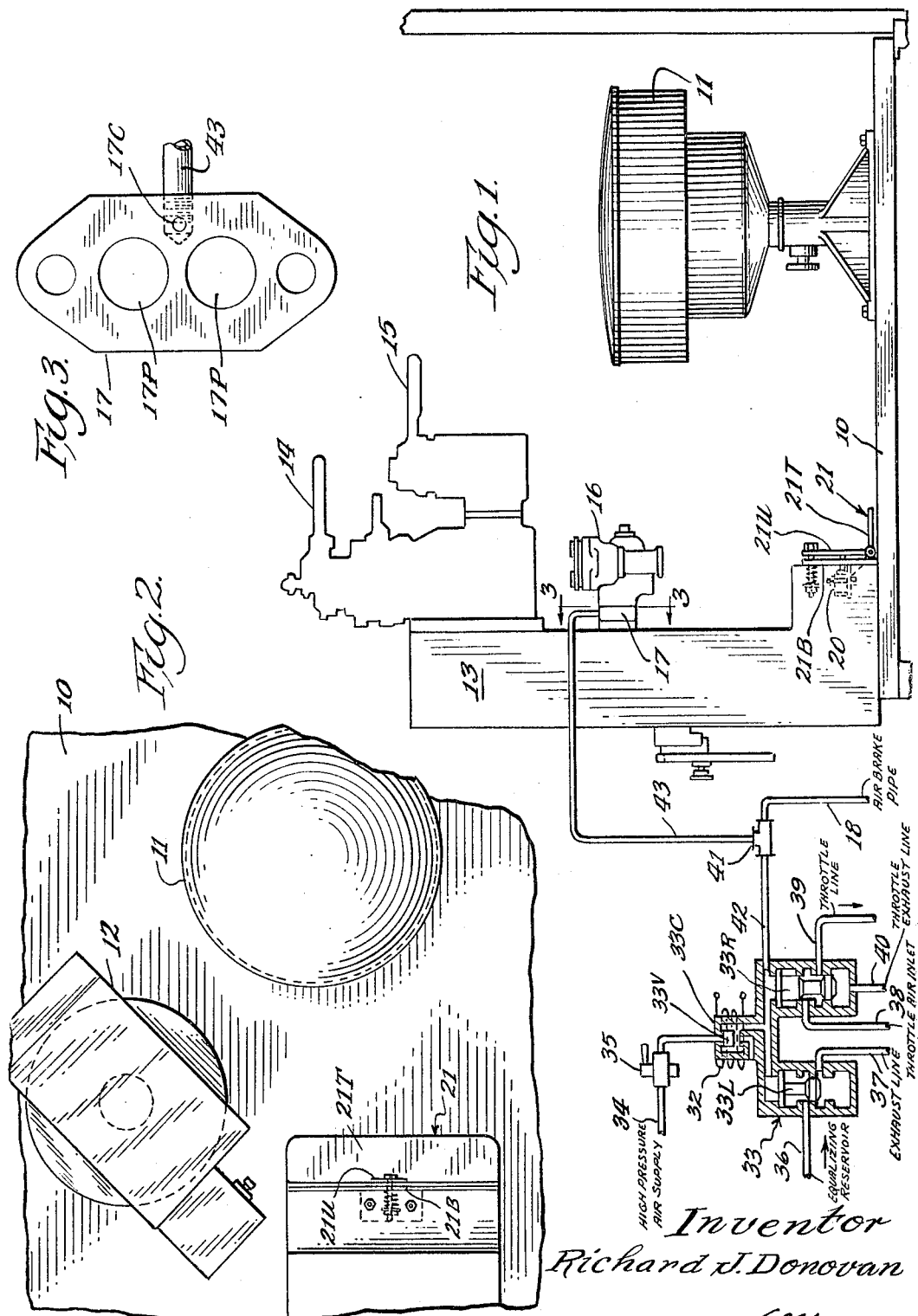

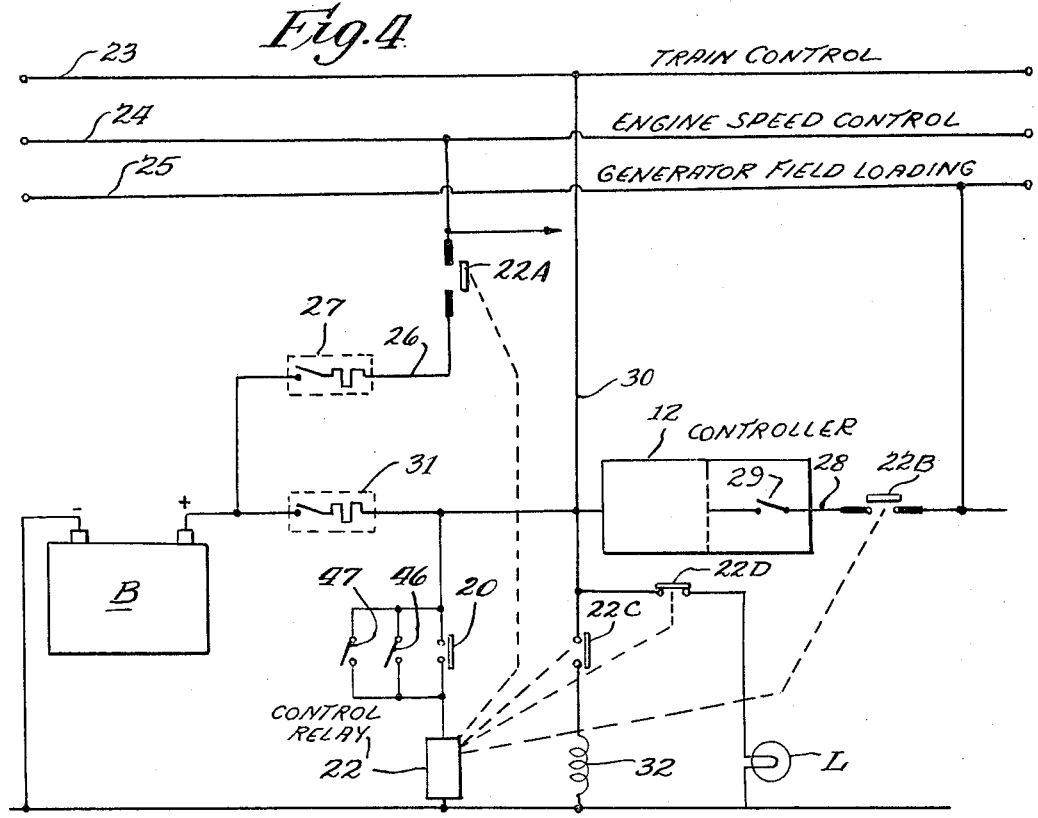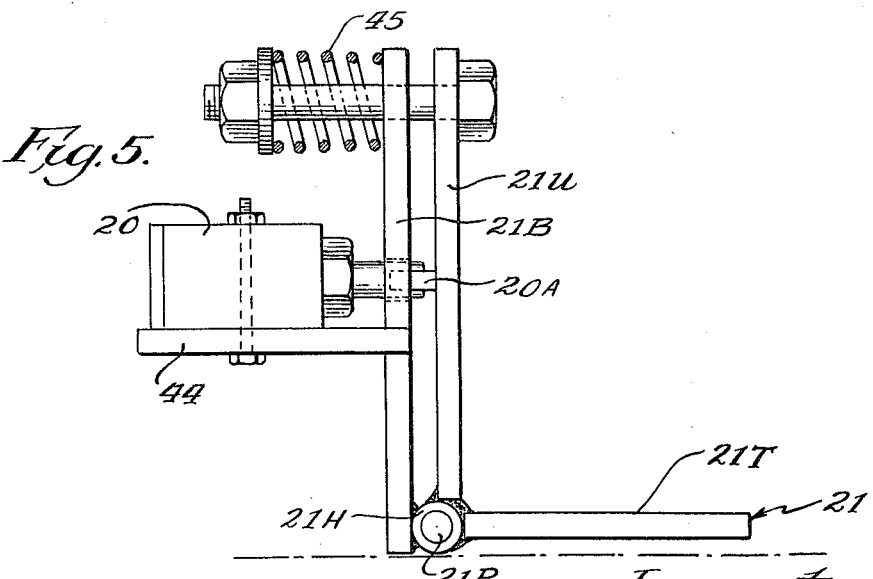

3,279,866
LOCOMOTIVE DEAD MAN CONTROL
Richard J. Donovan, 4050 N. 62nd, Milwaukee, Wis.
Filed Apr. 6, 1964, Ser. No. 357,656
6 Claims. (Cl. 303—19)

This invention relates to a safety control for stopping a locomotive in the event of death or incapacity of the engineer and more particularly, the invention is concerned with a unified safety control arrangement applicable to existing locomotives with a minimum of modification, additional parts and labor.

A dead man pedal has long been employed on certain locomotives such as those used in passenger and high speed freight service, but there is need for a safety control of this general type that is suited for universal application to road and switch power.

For universal application, it is necessary to provide a safety control system that is compatible with existing structures and operations and that facilitates adaptation to and interconnection with related equipment components.

The principal object of the invention is the provision of a simplified and improved safety control arrangement for universal application in existing locomotives for effecting a penalty brake application whenever the engineer is not at his assigned position.

Another object of the invention is the provision of a safety control that utilizes a simplified foot pedal operated electric switch arrangement.

Still another object of the invention is the provision of a safety control arrangement wherein a main sense switch effects a penalty brake application and concurrently effects a reduction of engine speed to idle and an unloading of the locomotive by deenergizing the generator field.

A further object of the invention is the provision of a safety control arrangement that lends itself to interconnection with related equipment components.

Other and further objects of the present invention will be apparent from the following description and claims and are illustrated in the accompanying drawings which show structure embodying preferred features of the present invention and the principles thereof, and what is now considered to be the best mode in which to apply these principles.

In the accompanying drawings forming a part of this specification and in which like numerals are employed to designate like parts throughout the same:

FIGURE 1 is a side elevational view of conventional facilities in a locomotive cab and includes a schematic diagram of control equipment that is incorporated therein for effecting a preferred safety control operation in the event the engineer should become disabled;

FIGURE 2 is a plan view of the portions of the locomotive cab illustrated in FIGURE 1;

FIGURE 3 is a view taken on line 3—3 of FIGURE 1, and showing an adapter plate in elevation;

FIGURE 4 is a wiring diagram of a preferred form of safety control circuit constructed in accordance with this invention; and FIGURE 5 is an enlarged side elevation of a foot pedal arrangement utilized in this invention.

Referring now to the drawings, and particularly to FIGURES 1 and 2 thereof, the pertinent parts of a locomotive cab as illustrated therein include the engineer's platform 10, the engineer's seat 11 mounted thereon, the usual controller 12, and the usual brake valve pedestal 13 which includes the handle 14 for the train brake or automatic brake that controls that train and the engine and which also includes the handle 15 for controlling the independent or engine brake for the locomotive. The brake valve pedestal 13 is illustrated as having mounted thereon a feed valve 16 of conventional type which is connected to internal passages in the pedestal 13 through ports 17P provided in an adapter plate 17 that is shown in FIGURE 3 as including separate infeed and outfeed ports 17P and a control port 17C. The arrangement is such that high pressure air from the main reservoir system normally is supplied through one of the ports 17P into the feed valve 16 which reduces this pressure and distributes it through the other of the ports 17P which leads back into the brake valve pedestal 13 and from there to the air brake pipe 18 by means of conventional piping connections that are already provided in existing locomotives and that are not shown in this disclosure.

In the usual arrangement, the pressure at the air brake pipe 18 as determined by the feed valve 16 may be maintained at a value on the order of 70 p.s.i., and so long as this pressure exists, the train brakes are held inactive. Brake application is normally effected by actuating the handle 14 to exhaust air from the air brake pipe 18, thereby reducing its pressure and allowing the brakes to act.

The ported adapter plate 17 that connects the feed valve 16 to the brake valve pedestal 13 has the additional control port 17C (FIGURE 3) and its function in cooperation with the feed valve 16 is such that the feed valve is held on and acts in the fashion described previously, only if the pressure applied at the control port 17C is at a value corresponding to that which is maintained in the air brake pipe 18. Typically, a pressure of 110 p.s.i. is maintained in the main reservoir system. The action of the feed valve 16 is also such that when a higher pressure value such as 110 p.s.i. acts at the control port 17C, the feed valve 16 is then "off" and does not supply pressurized air to the air brake pipe 18.

In accordance with this invention, a universally adaptable, easily installed safety control system is provided by employing an electrical sense switch 20 for operation by any suitable means, but preferably by means of a foot lever or pedal 21 installed in appropriate relation to the engineer's seat 11 and the location of the controller 12. This electrical sense switch 20 may then control not only the penalty application of the brakes, but concurrently may control the engine speed and the locomotive loading. Concurrent control is effected easily by providing a main power control relay 22 (FIGURE 4) which, during normal train operation, is held energized through the pedal actuated sense switch 20. The relay 22 is arranged to control a plurality of contacts 22A, 22B 22C and 22D. When relay 22 is energized contacts 22A, 22B and 22C are closed and contact 22D is open. When relay 22 is de-energized, contacts 22A, 22B and 22C are open and contact 22D is closed.

In FIGURE 4, the conventional train line circuits for train control, for engine speed control and for generator field loading, are designated 23, 24, and 25 respectively. Control circuits are tapped from the train lines and include a first line 26 that has the usual engine run switch 27, a second line 28 to the controller 12, which includes the usual generator field switch 29, and a third line 30 to the usual control and F.P. switch 31. Each of the circuits 26 and 28 includes and is controlled by a contact 22A and 22B, respectively, of the main power control relay 22, which is itself connected across the battery B. Another contact 22C from the power control relay 22 is connected in circuit with an actuating coil 32 of a brake magnet valve 33 (FIGURE 1) normally to energize the coil 32. Finally, an indicator light L is connected in circuit with another contact 22D from the power control relay 22 so that in the event a penalty application of the brakes is to begin, the light L will warn the engineer immediately, and permit him, where possible, to avoid such a penalty application by depressing the brake pedal 21 to re-close the sense switch 20 and re-energize the power control relay 22 and the brake magnet coil 32.

The brake valve 33 is best shown in FIGURE 1 and, in the preferred form illustrated for purposes of disclosure, is of a multiple spool, spring biased, pneumatic pressure type and it includes an air flow controlling element 33V, that is normally held closed by the normally energized coil 32 which is shown encircling the upper end of the valve casing 33C actuating the movable valve element 33V in the fashion of a solenoid. A high pressure air supply line 34 leads from the main reservoir system and feeds through a manual shut off valve 35 and into the top of the valve casing 33C. The valve casing 33C has a left-hand passage equipped with a movable spool 33L for controlling flow of air from the equalizing reservoir system 36 to an exhaust line 37, and has a right-hand passage equipped with a movable spool 33R for controlling flow of air from an inlet line 38 to a line 39 that is connected to actuate the throttle. The right hand passage is also provided with an exhaust line 40 for relieving air from the throttle line 39 during a penalty brake application.

The air brake control system of this invention is also equipped with a pressure-responsive differential air valve 41 having a pair of inlets arranged for alternative communication with a single central outlet. One of the inlets is connected to a line 42 that leads from the valve 33 for applying high pressure main reservoir air therethrough, only when the relay coil 32 is de-energized in conjunction with a penalty brake application. The differential valve 41 has its other inlet connected to the brake pipe 18 and its outlet is connected through a line 43 that is conected to the control port 17C (FIGURE 3) of the blanking plate.

In the preferred form, the sense switch is controlled by means of the foot pedal 21 which as shown in FIGURES 1, 2 and 5, has an elongated tread plate 21T, the center region of which is equipped with an upstanding pad 21U. The plate is pivoted to a stationary bracket 21B that is mounted to the side of the pedestal 13. The bracket 21B and plate have cooperating hinge portions 21H engaged on a common hinge pin 21P. The bracket 21B is also equipped with a shelf 44 to mount the sense switch 20 which has an actuating arm 20A projecting through the bracket 21B to a position of contact with the upstanding pad 21U of the pedal 21. A spring 45 normally biases the pedal 21 to the position in which it is illustrated in FIGURE 5, with the spring resiliently permitting downward swinging movement of the pedal 21 to enable the engineer to hold the sense switch 20 closed by depressing the pedal 21 during normal operating conditions.

Under this situation with sense switch 20 closed by the pedal being held down, the brakes are off and the locomotive may move free. At this time, the circuit of FIGURE 4 has its power control relay 22 and brake magnet relay 32 energized, the brake magnet relay being the coil 32 that controls the valve element 33V of FIGURE 1 so that main reservoir air from line 34 is blocked by this valve element 33V. Hence, under these conditions, the parts of the brake valve 33 are in the positions illustrated in FIGURE 1 wherein the right-hand spool 33R is up and the line 39 to the throttle is "live," and the left-hand spool 33L is up blocking exhaust thru lines 36 and 37 of the air in the equalizing reservoir system. Since main reservoir air is shut off at the magnet valve 33, the differential pressure valve 41 is selectively responsive to the pressure in the air brake pipe 18 and communicates this pressure through its outlet line 43 to the control port 17C of the adapter plate 17 that is associated with the feed valve 16. This pressure being at a value of 70 p.s.i. acts to hold the feed valve "on" for applying its reduced output pressure to the air brake pipe 18 (by connections that are not shown) to keep it charged to 70 p.s.i. and keep the train brakes "off." This condition will continue during normal operation of the locomotive, assuming the engineer maintains the foot pedal depressed and thereby maintains the sense switch 20 closed.

In the event the foot pedal is permitted to rise under the action of the spring 45, the sense switch 20 opens to de-energize the power control relay 22 and open each of its contacts 22A, 22B and 22C, and close contact 22D. The opening of contact 22C permits the brake magnet coil 32 to be de-energized and unseats the valve element 33V to admit high pressure air from the main reservoir system into the casing 33C to produce a number of functions concurrently.

The main reservoir air is permitted to feed through the valve casing 33C and through the line 42 up to the check valve 41 and the higher pressure of this main reservoir air system reverses the check valve 41 to enable this high pressure air to be applied to the control port 17C of the adapter plate 17 for effecting shut-off of the feed valve 16 so that no additional air is supplied to the air brake pipe 18. Concurrently, the right-hand spool 33R is moved down to shut off feed from inlet 38 to the throttle line 39 and the left-hand spool 33L is moved down to vent air from the equalizing reservoir system to exhaust line 37 through an appropriate orifice, thus causing a penalty brake application. At this same time the indicator light L is energized and the engineer, by responding instantaneously, may prevent the penalty brake application from being carried to completion. The right-hand spool valve 33R is employed only on locomotives where the throttle is air-controlled, in which case the downward movement of the spool 33R shuts off air to the throttle and also vents any trapped air from the throttle line 39 through exhaust line 40.

It should be noted that the de-energizing of the power control relay 22 by opening of the sense switch 20 also causes the control circuit 26 that includes the engine run switch 27 and the control circuit 28 that includes the generator field switch 29 to be opened so that the engine speed is cut down to idle and the load on the locomotive is cut out.

The circuit of FIGURE 4 includes a nullifying switch 46 bridged across the terminals of the sense switch 20 for nullifying the entire safety control system during intervals when the handle 15 for the independent air brake lever is set to 25 p.s.i. or more. The sense switch 20 is also bridged by a manual toggle switch 47 provided on the engineer's panel to nullify the safety control system in the event of a failure in some part of this system. Correspondingly, the cut-off cock 35 provided in the magnet valve air line 34 enables provision of normal braking in the event of air failure.

It should be apparent that the present system is easy to install and does the complete job required in a penalty brake application, in that the engine speed is reduced to idle and the locomotive loading is cut off simultaneously with application of the brakes, all of this being affected concurrently by means of contacts controlled by the power control relay 22. The use of an electrical sense switch 20 is compatible with the existing electrical controls on the locomotive, and it is integrated to the air brake system through the medium of the magnet valve 33 which is controlled by the valve coil 32 to effect application of air pressure and regulate exhaust of the air from the air brake pipe 18. The present approach is the simplest possible for adaptation universally to existing locomotives, and it makes use of the electrical control lines that already exist and requires but a minimum of modification in the electrical connections and in the air brake connections.

Thus, while preferred constructional features of the invention are embodied in the structure illustrated herein, it is to be understood that changes and variations may be made by those skilled in the art without departing from the spirit and scope of the appending claims.

What is claimed is:

1. A safety control system for a locomotive equipped with an air actuated engine throttle, conventional train line circuits, and an air brake pipe connected to maintain train brakes off when a predetermined pressure value exists in said pipe, said system comprising a sense switch, means mounted in the locomotive for operation by an engineer and connected to actuate said sense switch in accordance with the position of the engineer in the locomotive, a power circuit including said sense switch and a main power relay normally held energized when said means is being operated by the engineer, said power relay having a plurality of contacts normally held closed when said relay is energized, control circuits connected with certain of said train line circuits for regulating train control and locomotive loading and each having a separate one of said contacts in circuit controlling connection, and a relay controlling exhaust of air from said air actuated engine throttle and air brake pipe connected through another one of said contacts to be de-energized upon actuation of said switch.

2. The safety control system in accordance with claim 1 which additionally includes indicating means simultaneously actuated by said sense switch when same is actuated to indicate said actuation and wherein said means mounted in the locomotive for operation by an engineer is a foot pedal connected to operate said sense switch by an engineer properly positioned within the locomotive.

3. A safety control for a locomotive equipped with an engine throttle, conventional train line circuits, a main air reservoir system, an air brake pipe connected to maintain train brakes off when a predetermined pressure value exists in said pipe, an equalizing air reservoir system connected to maintain said pressure value in said pipe, and a feed valve having an inlet connected to said main reservoir system and an outlet connected to supply air at said predetermined pressure value to said air brake pipe, said control comprising an air line connected to said feed valve to regulate output therefrom, a pressure responsive differential air valve having a pair of inlets alternatively communicable with an outlet, said outlet being connected to said air line and one of said inlets being connected to said air brake pipe, first means responsive to application of air from said main reservoir system for establishing communication of said equalizing reservoir system with exhaust, second means responsive to application of air from said main reservoir system for shutting off the throttle, a relay operable in one condition to effect application of air concurrently from said main reservoir system to said first means, to said second means and to the other inlet of said differential air valve, control circuits for regulating engine speed and locomotive loading, a power circuit having a main power relay connected to a sense switch to be controlled thereby, said power relay having contacts connected to control said first named relay and said control circuits concurrently, and means mounted in the locomotive for operation by the engineer and connected to actuate said sense switch.

4. A safety control for a locomotive equipped with an engine throttle, conventional train line circuits, a main air reservoir system, an air brake pipe connected to maintain train brakes off when a predetermined pressure value exists in said pipe, an equalizing air reservoir system connected to maintain said pressure value in said pipe, and a feed valve having an inlet connected to said main reservoir system and an outlet connected to supply air at said predetermined pressure value to said air brake pipe, said control comprising an air line connected to said feed valve to regulate output therefrom, a pressure responsive differential air valve having a pair of inlets alternatively communicable with an outlet, said outlet being connected to said air line and one of said inlets being connected to said air brake pipe, first means responsive to application of air from said main reservoir system for establishing communication of said equalizing reservoir system with exhaust, second means responsive to application of air from said main reservoir system for shutting off the throttle, a relay operable in one condition to effect application of air concurrently from said main reservoir system to said first means, to said second means and to the other inlet of said differential air valve, control circuits for regulating engine speed and locomotive loading, a power circuit having a main power relay connected to a sense switch to be controlled thereby, said power relay having contacts connected to control said first named relay and said control circuits concurrently, and a foot pedal for actuation by an engineer and connected to operate said sense switch.

5. A safety control system for a locomotive equipped with an engine throttle, conventional train line circuits, a main air reservoir system, an air brake pipe connected to maintain train brakes off when a predetermined pressure value exists in said pipe, an equalizing air reservoir system connected to maintain said pressure value in said pipe, and a feed valve having an inlet connected to said main reservoir system and an outlet connected to supply air at said predetermined pressure value to said air brake pipe, said system comprising a sense switch, means operable by an engineer and connected to actuate said sense switch in accordance with the position of the engineer in the locomotive, a power circuit including said sense switch and a main power relay normally held energized when said means is being operated by the engineer, said power relay having a plurality of contacts normally held closed when said relay is energized, control circuits for regulating engine speed and locomotive loading and each controlled by a separate one of said contacts, an air line connected to said feed valve to regulate output therefrom, a pressure responsive differential air valve having a pair of inlets alternatively communicable with an outlet, said outlet being connected to said air line and one of said inlets being connected to said air brake pipe, first means responsive to application of air from said main reservoir system for establishing communication of said equalizing reservoir system with exhaust, second means responsive to application of air from said main reservoir system for shutting off the throttle, and a relay operable in one condition to effect application of air concurrently from said main reservoir system to said first means, to said second means and to the other inlet of said differential air valve.

6. A safety control for a locomotive equipped with an engine throttle, conventional train line circuits, a main air reservoir system, an air brake pipe connected to maintain train brakes off when a predetermined pressure value exists in said pipe, an equalizing air reservoir system connected to maintain said pressure value in said pipe, and a feed valve having an inlet connected to said main reservoir system and an outlet connected to supply air at said predetermined pressure value to said air brake pipe, said system comprising a sense switch, a foot pedal mounted in the locomotive for actuation by an engineer properly positioned therein and connected to operate said sense switch, a power circuit including said sense switch and a main power relay normally held energized when said means is being operated by the engineer, said power relay having a plurality of contacts normally held closed when said relay is energized, control circuits for regulating engine speed and locomotive loading and each controlled by a separate one of said contacts, an air line connected to said feed valve to regulate output therefrom, a pressure responsive differential air valve having a pair of inlets alternatively communicable with an outlet, said outlet being connected to said air line and one of said inlets being connected to said air brake pipe, first means responsive to application of air from said main reservoir system for establishing communication of said equalizing reservoir system with exhaust, second means responsive to application of air from said main reservoir system for shutting off the throttle, and a relay operable in one condition to effect application of air concurrently from said main reservoir system to said first means, to said second means and to the other inlet of said differential air valve.

References Cited by the Examiner

UNITED STATES PATENTS

| 1,682,482 | 8/1928 | Campbell | 303—66 |
| 2,068,340 | 1/1937 | Logan | 303—19 |
| 2,905,507 | 9/1959 | May | 303—19 |

EUGENE G. BOTZ, Primary Examiner.

UNITED STATES PATENT OFFICE
CERTIFICATE OF CORRECTION

Patent No. 3,279,866                                October 18, 1966

Richard J. Donovan

It is hereby certified that error appears in the above numbered patent requiring correction and that the said Letters Patent should read as corrected below.

Column 6, line 51, for "A safety control" read -- A safety control system --.

Signed and sealed this 12th day of September 1967.

(SEAL)
Attest:

ERNEST W. SWIDER                                     EDWARD J. BRENNER
Attesting Officer                                            Commissioner of Patents